(12) United States Patent
Dearing et al.

(10) Patent No.: US 9,336,510 B2
(45) Date of Patent: May 10, 2016

(54) SYSTEM AND METHOD FOR PROVIDING REAL-TIME TRACKING OF ITEMS IN A DISTRIBUTION NETWORK

(71) Applicant: United States Postal Service, Washington, DC (US)

(72) Inventors: Stephen M. Dearing, Herndon, VA (US); Kuldip K. Goyal, Alexandria, VA (US); Carla F. Sherry, Annandale, VA (US); Amy B. Cradic, Reston, VA (US); C. Scot Atkins, Chantilly, VA (US); Himesh A. Patel, Centerville, VA (US)

(73) Assignee: The United States of America Postal Service, Washington, DC (US)

( * ) Notice: Subject to any disclaimer, the term of this patent is extended or adjusted under 35 U.S.C. 154(b) by 0 days.

(21) Appl. No.: 14/309,747

(22) Filed: Jun. 19, 2014

(65) Prior Publication Data

US 2014/0374478 A1 Dec. 25, 2014

Related U.S. Application Data

(60) Provisional application No. 61/837,047, filed on Jun. 19, 2013, provisional application No. 61/936,239, filed on Feb. 5, 2014.

(51) Int. Cl.
*G06K 7/00* (2006.01)
*G06Q 10/08* (2012.01)

(52) U.S. Cl.
CPC .......... *G06Q 10/087* (2013.01); *G06Q 10/0833* (2013.01)

(58) Field of Classification Search
USPC ................. 235/375, 385, 435, 439, 451, 462; 705/5, 35–45
See application file for complete search history.

(56) References Cited

U.S. PATENT DOCUMENTS

| 2003/0222141 | A1 | 12/2003 | Vogler et al. |
| 2003/0222762 | A1 | 12/2003 | Beigl |
| 2005/0209731 | A1 | 9/2005 | Penkar et al. |
| 2006/0163338 | A1 | 7/2006 | Allen et al. |
| 2009/0063233 | A1 | 3/2009 | Kumar et al. |
| 2014/0084060 | A1* | 3/2014 | Jain et al. ...................... 235/385 |

OTHER PUBLICATIONS

International Search Report and Written Opinion dated Feb. 4, 2016 for International Patent Application No. PCT/US14/43266, which shares priority of U.S. Appl. Nos. 61/837,047, filed Jun. 19, 2013; and 61/936,239, filed Feb. 5, 2014 with Subject U.S. Appl. No. 14/309,747, and cites the above-identified references numbered 1-4.

* cited by examiner

*Primary Examiner* — Matthew Mikels
(74) *Attorney, Agent, or Firm* — Knobbe Martens Olson & Bear LLP

(57) ABSTRACT

Systems and methods of processing items. Items in a distribution network or process may be scanned at every handling point in the distribution network, and each scan is recorded in a central repository. The scan information can be used to generate real-time access to data, analytical tools, predictive tools, and tracking reports.

12 Claims, 3 Drawing Sheets

SYSTEM AND METHOD FOR PROVIDING REAL-TIME TRACKING OF ITEMS IN A DISTRIBUTION NETWORK

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is related to and claims the benefit of U.S. Application No. 61/837,047, filed Jun. 19, 2013, and U.S. Application No. 61/936,239 filed Feb. 5, 2014.

BACKGROUND

1. Field

This disclosure relates to a providing real-time information about items in a distribution network.

2. Description of the Related Technology

Items are received, tracked, and distributed using distribution networks. As items are travelling through the distribution network, such as a delivery network, the status of each item at any time may not be available. Thus, operators of distribution networks, such as, e.g., the United States Postal Service, or others, may desire to provide real-time tracking and full item visibility as items move throughout the distribution network. By being able to track item status in real-time, a distribution network can realize an improvement in operation, efficiency, and distribution analytics, and provide improved new products and services for users of the distribution network.

SUMMARY OF CERTAIN INVENTIVE ASPECTS

A system providing visibility, or real-time information, of each item at any time provides a distribution network or operator of a distribution network additional analytical capabilities and improved service performance measurements. Improved service performance measurements can enable users, shippers, mailers, or any other entity using a distribution network to understand how the distribution network is performing with regard to the user's distribution items. Improved performance analytics also allow the operator of the distribution network to identify inefficiencies, bottlenecks, or other problems in the distribution network.

Item visibility can refer to the ability to know and track the status of each item within a distribution network. Full visibility of distribution items provides additional capabilities for predictive workload analytics, including predicting incoming item volumes and predicting the resources necessary during a certain period of time. These predictive workload analytics can increase efficiency and realize savings in operating costs. Item visibility also provides item owners, shippers, recipients, and others with access to information regarding each item in the distribution network in real time. The data gathered in a full visibility system can be aggregated, manipulated, and used for diagnostics, metrics, and to offer additional services for users of the distribution network.

In some aspects, a system for real-time tracking of items comprises a data repository in communication with a central processor, the central processor controlling input and output from the data repository; a plurality of item processing devices, each item processing device comprising: a scanner configured to scan a computer readable code on an item being processed in the item processing device to generate scan data; and a communication module configured to communicate with the central processor and provide the scan data to the central processor for storage in the data repository in real-time; at least one module in communication with the central processor, the at least one module configured to request, receive, and manipulate the scan data from the data repository in real-time, and to generate information in real-time based on the manipulated scan data; and an interface in communication with the module, wherein the interface is configured to provide access to the generated information in real-time.

In some embodiments, the scan data comprises information indicative of the computer readable code and information indicative of the scanner.

In some embodiments, the information indicative of the scanner comprises scanner type, scanner location, and scan time.

In some embodiments, the at least one module comprises an inventory module configured to generate a real-time, or near real-time inventory of items at a facility based on the received scan data.

In some embodiments, the at least one module comprises a predictive workload module configured to generate an expected inventory of items at a facility based on the received scan data.

In some embodiments, the data repository is in communication with a plurality of distribution network systems, wherein the plurality of distribution network systems are configured to provide network information to the data repository.

In some embodiments, the plurality of distribution network systems include a transportation information system configured to provide transportation resource utilization information.

In some embodiments, the module comprises a predictive workload module configured to generate an expected inventory of items at a facility based on the received scan data and based on the transportation resource utilization information.

In some embodiments, the plurality of distribution network systems includes an item processing equipment system configured to provide item processing equipment information.

In some embodiments, the module comprises a predictive workload module configured to generate an expected inventory of items at a facility based on the received scan data and based on the item processing equipment information.

In some embodiments, the module is a performance measurement module configured to analyze service performance based on the scan data.

In some embodiments, the system further comprises an access portal configured to provide user access to the scan data or the generated information based on the manipulated scan data.

In some embodiments, the access portal is configured to allow selective access to scan data from items associated with a particular user.

In another aspect, a method of tracking a plurality of items comprises receiving scan data for the plurality of items, the scan data generated from computer readable identifiers on the plurality of items; storing the scan data in a data repository; manipulating, using a processor, scan data stored in the data repository to generate item information in real-time or near real-time; and communicating the generated item information.

In some embodiments, the scan data comprises information indicative of a scanner used to generate the scan data.

In some embodiments, the information indicative of the scanner comprises scanner type, scanner location, and scan time.

In some embodiments, the generated item information comprises a real-time inventory of items at a facility.

In some embodiments, the generated item information comprises an expected inventory of items at a facility.

In some embodiments, the method further comprises generating a predictive workload for the facility based on the expected inventory of items.

DETAILED DESCRIPTION

Figure 1:
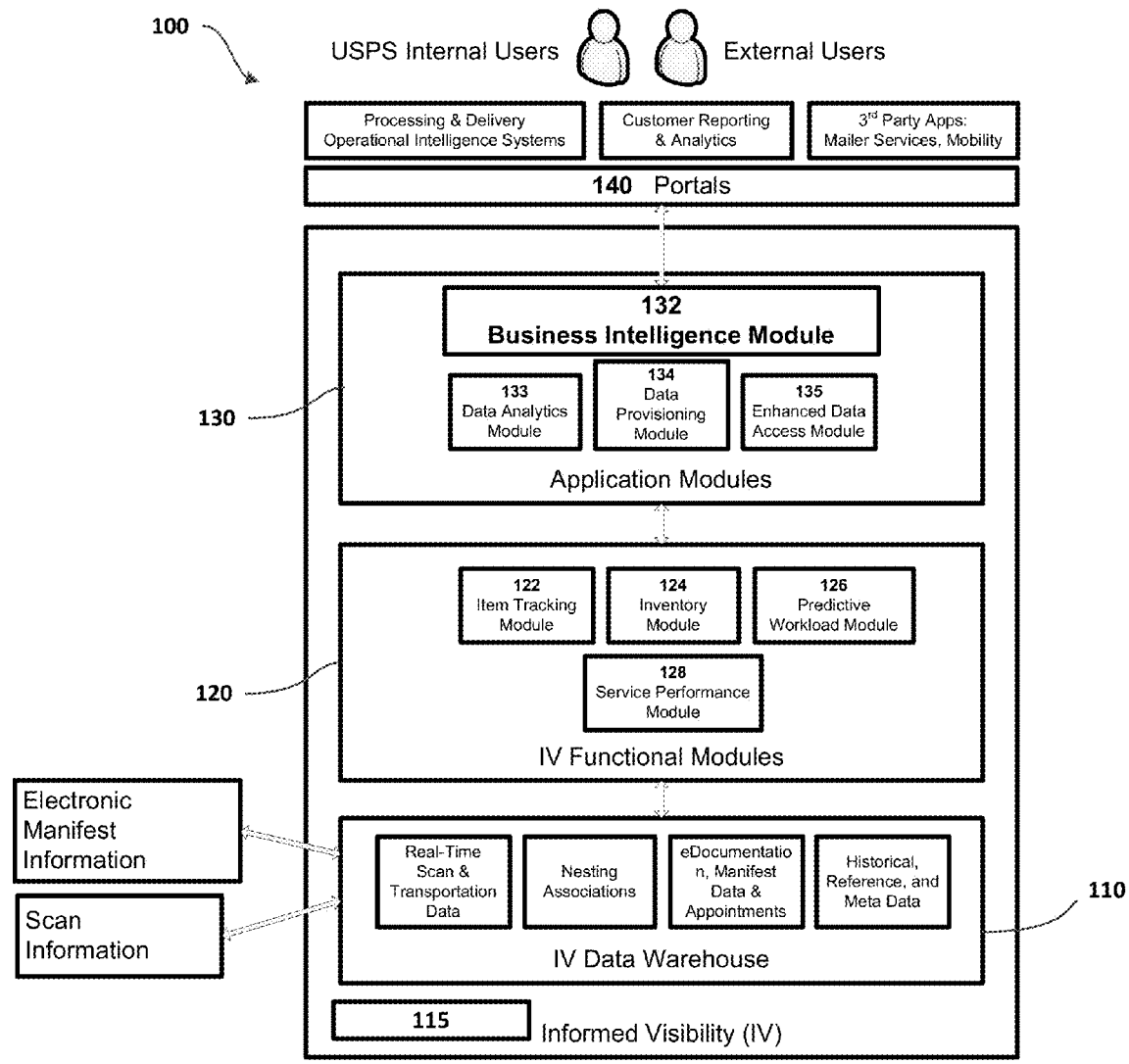
FIG. 1 depicts a block diagram of an embodiment of a system for real-time tracking of distribution items.

In the following detailed description, reference is made to the accompanying drawings, which form a part thereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

The present disclosure relates to systems and methods for providing full visibility of items in a distribution network. This may include providing real-time tracking capability of each component in a distribution network. For example, real-time tracking is provided for each item in the distribution network, as well as for components of the distribution network, such as trays, containers, carriers, trucks, trains, planes, crates, boxes, bags, and many other components of the distribution network. The present disclosure also relates to systems and methods of using real-time tracking to provide service performance measurement and diagnostics, analytical capabilities, improved inventory control and management, provide information to third parties, to gather and process information, and to provide a greater range of services to customers. The term "real-time" may mean that data is available to a user, either internal or external, as soon as it is available or generated. The term "near real-time" may mean that the data is available shortly after it is available or generated, such as when a piece of equipment stores scan information for a time prior to making the information available. For example, a camera or scanner on item processing equipment may batch images or scans for a specified period, such as after a set number of scans, or after an elapsed time, such as every 30 seconds, every minute, every 15 minutes, or every hour.

In order to provide the above capabilities, the real-time tracking data must be stored. In a distribution network with many items, the storage capability must be large in order to receive, store, and provide access to the stored real-time data. In some embodiments, the system includes a central data storage repository in communication with a powerful analytical engine with real-time processing capabilities.

A distribution network may comprise multiple levels. For example, a distribution network may comprise regional distribution facilities, hubs, and unit delivery facilities, or any other desired level. For example, a nationwide distribution network may comprise one or more regional distribution facilities having a defined coverage area (such as a geographic area), designated to receive items from intake facilities within the defined coverage area, or from other regional distribution facilities. The regional distribution facility can sort items for delivery to another regional distribution facility, or to a hub level facility within the regional distributional facility's coverage area. A regional distribution facility can have one or more hub level facilities within its defined coverage area. A hub level facility can be affiliated with a few or many unit delivery facilities, and can sort and deliver items to the unit delivery facilities with which it is associated. In the case of the United States Postal Service, the unit delivery facility may be associated with a ZIP Code. The unit delivery facility receives items from local senders, and from hub level facilities or regional distribution facilities. The unit delivery facility also sorts and stages the items intended for delivery to destinations within the unit delivery facility's coverage area.

The terms mail, mailpiece, and others terms are used to describe embodiments of the present development. These terms are exemplary only, and the scope of the present disclosure is not limited to mail, mailpiece, or postal applications.

As used herein, the term item may refer to an individual article, object, agglomeration of articles, or container having more than one article within, in a distribution system. The item may be a letter, magazine, flat, luggage, package, box, or any other item of inventory which is transported or delivered in a distribution system or network. The term item may also refer to a unit or object which is configured to hold one or more individual items, such as a container which holds multiple letters, magazines, boxes, etc. The term item may also include any object, container, storage area, rack, tray, truck, train car, airplane, or other similar device into which items or articles may be inserted and subsequently transported, as are commonly used in distribution systems and networks.

FIG. 1 depicts a high-level block diagram of an embodiment of a system for real-time tracking and analysis of items in a distribution network.

In some embodiments, a distribution entity, such as a commercial carrier, the United States Postal Service, or other distributor, tracks each item throughout the distribution process. To allow for real-time tracking of items in a distribution network, each item has a unique identifier, such as a computer-readable code. In some embodiments, the computer readable code may be a barcode, such as an Intelligent Mail Barcode® (IMb™), an RFID tag, a QR code, an alphanumeric code, or any other desirable computer readable code, which uniquely identifies the item and/or encodes information relating to the item. Each computer-readable code may be scanned by processing equipment, carriers with mobile scanners, personnel in the distribution network facilities, transportation providers, or by other entities within the distribution chain. Scan information, which can include the computer readable code, is transmitted to and stored in a central repository.

In some embodiments, a real-time tracking system may be termed an informed visibility (IV) system, where visibility is used to describe availability of information about an item at each time or point in a distribution process. An informed visibility system enhances efficiency and responsiveness by creating a comprehensive and integrated solution that provides real-time access to data, reports, and analytical tools that will improve mail tracking, service and scan performance measurement and monitoring, as well as provide the ability to perform mail inventory management, predictive workload analysis and diagnose service performance issues.

In some embodiments, the predictive workload system can identify predicted periods of higher volume and of lower volume for a facility, transportation resource, and the like, and can provide alerts which enable an internal or external user to adjust resources, personnel, etc., accordingly.

An IV system provides functionality in several areas. For example, IV system provides comprehensive data repository, which includes an operational data store and a data warehouse which will be described in greater detail below.

Referring to FIG. 1, a distribution network comprises an IV or real-time tracking system 100. The real-time tracking system 100 comprises a data warehouse 110. The data warehouse 110 comprises one or more processors and storage capabilities. The data warehouse 110 may be hosted on or use a high density supercomputing platform. The high density supercomputing platform may use a transactional record processing system, to gain real-time or near real-time scan, tracking, and other information, including performance metrics and business intelligence through fast, intensive, and efficient data-mining of data stored in the data warehouse 110. The data warehouse 110 can use a memory centric database (MCDB) solution as all or part of the data warehouse 110, which is a reliable system with high availability and scalability. The high density supercomputing platform can use both the SGI UV1000 and SGI UV2000 hardware frames which combine blade technology with very high solid state density and wide native bi-sectional bandwidth including routed non-uniform memory access (NUMA) interconnecting architecture. The data warehouse 110 hardware can expand both horizontally (clustered) and vertically (large single system images with very large globally addressable CPU/memory structures) virtually indefinitely in multiple axes, I/O, CPU, memory, and storage. The supercomputing system of the real-time tracking system 100 may comprise a supercomputing system such as that described in U.S. patent application Ser. No. 13/083,396, filed Apr. 8, 2011, and entitled "LOCALIZED DATA AFFINITY SYSTEM AND HYBRID METHOD," the entire contents of which are herein incorporated by reference.

The data warehouse 110 provides a single data repository of scan event and diagnostic data that supports real-time item tracking, service and scan performance, and analytics. The data warehouse 110 includes a computer-readable storage medium and provides a single data repository of item (e.g., letter, and flat mail visibility) events and service performance data. It includes all handling events, nesting associations, item attributes, electronic documentation, transportation information, appointments, and aggregate item visibility data (e.g., item inventory, predictive workload, and service score aggregates). The data warehouse 110 receives and stores a significant volume of daily transactional data received through the system interfaces. Specific examples of transactional data volume are provided elsewhere herein. The data warehouse 110 has the capacity to meet long-term storage needs, and is designed for high availability and redundancy of all critical data. The data warehouse 110 may comprise hardware to support storage, processing, and transmission of 100 terabytes (TB) of information or more. The data warehouse 110 also processes, manipulates, and provisions received and/or stored data in accordance with the requirements of the real-time tracking system, which may be encoded in system operating instructions.

The data warehouse 110 may store three basic categories of data, and can store these types of data in different forms, databases, etc., as needed to support operation of the real-time tracking system 100. For example, the data warehouse 110 may store transactional data, reference data, and aggregate data. Transactional data may include item tracking data and service performance information that is needed for real-time processing, and must accommodate a high volume of item and handling event data. The reference data may be stored in a reference database which stores information required for business rules, logic, and other real-time tracking system 100 data, which does not change frequently. For example, the reference data can include item processing equipment maintenance schedules and capacities, facility layouts, carrier routes, transportation routes, sorting plans, etc. The aggregate data may be stored in an aggregate database which can be used to support functional modules and application modules, and includes data which has been aggregated, manipulated, or otherwise used, and is based on data from the transactional data store.

In some embodiments, the data warehouse 110 is the single data repository for all item scan data that supports item tracking; service performance measurement; service performance monitoring, alert, and diagnostics; scan performance measurement; mail inventory management, and analytics for predictive workloads. In some embodiments, the data warehouse 110 is a computer readable storage medium, such as a memory. The memory may be structured as a database or other similar structure to control, sort, and efficiently process data for storage and retrieval, such as a memory centric database system. In some embodiments, the data warehouse 110 may be housed in a single location. In some embodiments, the data warehouse 110 may be distributed across one or more facilities networked together. In some embodiments, the data warehouse 110 comprises a processor which is configured to control all the functions and features of the data warehouse 110. The processor is configured to receive and execute operating instructions, to receive and send communication requests to other processors, to provision data in real-time or near real-time, and perform other desired features of the real-time tracking system 100.

The data warehouse 110 receives, stores, and processes all scan data from processing equipment in a processing facility, handheld or portable scanning devices. The scan data for all items, e.g., mailpieces, letters, flats, parcels), bundles, handling units (such as trays and sacks), and containers (such as pallets and other containers) is received into the data warehouse 110, processed for real-time or near real-time transmission and analysis, and/or stored. The data warehouse 110 receives, stores, and processes information regarding all the items in the distribution network. The data warehouse 110 also receives, stores, and processes all necessary electronic documentation information in support of item tracking; service performance measurement; service performance monitoring, alerts, and diagnostics; scan performance measurement; mail inventory management, and analytics for predictive workloads. The data warehouse 110 receives, stores, and processes all manifest information, load events and nesting relationships, in order to maintain the relationship between nested piece to bundle, piece to handling unit, handling unit to container, container to truck, etc. The data warehouse 110 receives, stores, and processes all unload events and de-nesting relationships, in order to verify the relationship between nested piece to bundle, piece to handling unit, handling unit to container, container to truck, etc., and in order to modify associated scan events to nested pieces and handling units based on verified de-nesting data. The data warehouse 110 receives, stores, and processes all associations between equivalent/corresponding barcodes, which may represent the same item. The data warehouse 110 receives, stores, and processes transportation data, in order to support item tracking, analytics for predictive workloads, and service performance diagnostics. In some embodiments, the data warehouse 110 receives, stores, and processes carrier operation scan events from carrier scanning devices including piece-level scan information, in order to maintain the relationship between handling unit to carrier and to associate scan events to carrier-possessed objects, such as generating an implied out-for-delivery scan for all carrier-possessed handling units and their nested pieces. The data warehouse 110 receives, stores, and maintains delegation profile information to include by/for relationships and other data delegation relationships, in order to support delegation of item tracking data.

The data warehouse 110 receives, processes, and readies data and information for reporting in real-time or near real-time. The data warehouse 110 receives all data necessary to support item tracking, service performance measurement, service performance monitoring, alerts, and diagnostics, scan performance measurement, mail inventory management, and analytics for predictive workloads shall be maintained. In some embodiments, scan data can be maintained for a minimum number of days, e.g., for 120 days, in support of legal requirements for reporting service measurement, and aggregate and transactional data can be maintained for a minimum of 2 years for historical analysis and reporting purposes.

The data warehouse 110 comprises a communications module 115, which is configured to receive the communications from all the various systems, servers, modules, computers, and facilities of the distribution network which provide input, receive output, or are otherwise connected to the real-time tracking system 100. The communication module 115 is controlled by a processor, and information received via the communication module is stored in the data warehouse 110. The communications module 115 provides wired communication pathways for some components of the real-time tracking system 100. The communications module 115 also provides connections to various wireless networks, such as internet connections, mobile data networks such as cellular networks, wireless local and wide area networks, and any other desired wireless or wired communication method.

The real-time tracking system 100 ensures that data is secured and only provisioned to permitted parties. The real-time tracking system 100 maintains or provides access through referential data sources, information on facilities, operation codes, carrier routes, delivery points, transportation, etc., in order to support reporting and analytical capabilities. The real-time tracking system 100 is configured to store and maintain operating plans (documented policies and configurations) in order to support predictive workloads and diagnostic capabilities; is configured to store and maintain holiday and non-processing day information in support service performance measurement; to determine the scanning sequence for items, in order to know which items had contact with each other and in order to monitor if an item is being run in the proper sequence for sorting.

The real-time tracking system 100 includes functional modules 120 which support or provide the system functionality described herein. The functional modules 120 can be programs which run on the computer(s) of the real-time tracking system, or can be embodied on separate computers which are in communication with the real-time tracking system 100.

Item tracking provides users with the ability to track items, such as mailpieces, bundles, trays, containers, vehicles, etc., through the delivery process. Analytics for predictive workloads provides a predictive workload tool that enables facilities to project and forecast inbound item volume, item types, and equipment types needed for processing, in order to more effectively plan for staffing, staging, and delivery of items.

A tracking module 122 interfaces with the data warehouse 110 to provide and obtain real-time or near real-time tracking information for any item in the distribution network. For example, the tracking module 122 tracks the status and/or location of each item in the distribution network. As the data warehouse 110 receives item scan information, the tracking module 122 can request or receive information regarding item tracking. The tracking module 122 may be used to track an individual item or a group of items, grouped according to shipper, an identification code, destination, geography, delivery date, item owner, or any other desired grouping. To facilitate the grouping of items for tracking, the computer readable codes on items may include an identification code, or other information regarding destination, delivery time, shipper, etc. The tracking module 122 can be accessed by a user through an interface descried below, in order to track items in the distribution network in real-time, or to provide a snapshot of the location of each of the user's items within the distribution network.

An Inventory module 124 is one of the functional modules 120. The inventory module 124 provides an inventory of all items in a distribution network based on various criteria. For example, inventory module 124 can provide an inventory of items in a given geographical location, such as a regional distribution facility, a unit delivery facility, a vehicle, a carrier's bag, or any other desired area. Inventory module 124 compiles item inventory information by interfacing with the data warehouse 110 and requesting appropriate item information. For example, each facility, node, container, etc. has a unique identifier which is known to the real-time tracking system, and is associated with items which are located in that particular location. The inventory module 124 can request item information for each item which is associated with a particular location, container, and the like. This information can be provided on a real-time or near real-time basis, or can be provided upon request by a requesting entity via portals 140 in the real-time tracking system 100.

Predictive workload module 126 provides predicative information of item inventories, equipment needs, personnel needs, or other processing or delivery needs based on current and predicted item inventories. Predictive workload module 126 interfaces with the data warehouse 110 and the inventory module 124 to predict inventories, workloads, personnel, etc. The predictive workload module 126 is configured to provide predictive information for the distribution network as a whole, or for any component thereof. For example, a regional distribution facility includes item processing equipment, which require certain staffing of human resources in order to operate efficiently. The predictive workload module 126 can operate automatically, or on demand, such as when requested by facility personnel. The predicative workload module 126 is used to obtain, from the data warehouse 110, information for each item which is en route to the regional distribution facility, based on electronic manifest records, scan information, routing information, etc. The information can include item type, item size, item volume, item weight, special handling requirements, item class of service, and any other desired and stored information.

The predictive workload module 126 obtains current facility inventory from the inventory module 124, or directly from the data warehouse 110. The predicative workload module 126 also generates, receives, or otherwise obtains historical inventory information. For example, the predictive workload module 126 obtains or generates historical inventory information. The historical inventory information may include yesterday's inventory or processing volume, the last few days of inventory, inventory or volume for the same day of the week on the previous week, inventory or volume from the same day the previous year, or any other desired historical inventory or volume levels. The predictive workload module 126 then predicts what the incoming inventory for the facility will be for a given period or at a given time. The predictive workload module 126 also stores or can obtain facility equipment information, including the types of equipment at a facility, the number of operators required for each piece of equipment, the number of transportation vehicles available at the facility, and other similar facility information.

Based on all the foregoing information, the predictive workload module 126 then generates predictive information regarding which pieces of equipment should be operated, how many operators will be needed to operate the equipment, how many vehicles will be needed to transport the items, when the processing runs should start and end, and any other desired information. These predictive workload data can be used to optimize run time on equipment, schedule only needed operators, personnel, vehicles, and the like. In some embodiments, the predictive data can be provided far enough in advance, that staffing decisions can be made and work schedules generated, such as 2-3 days in advance, a week in advance, or any other desired time.

The predictive workload module 126 may analyze transportation capacity and usage of various transportation resources and compare with incoming item inventory to develop a "hold that truck" instruction. For example, if a truck leaving a facility is not at capacity, and the real-time tracking system 100 identifies incoming items which can be loaded onto the truck, and if there are no items on the truck whose service class or delivery date would be jeopardized, the predictive workload module 126 may instruct facility personnel to delay the departure of the truck a set number of minutes or hours. This can facilitate more efficient usage of resources without jeopardizing delivery schedules.

The predictive workload module 126 may also provide a predictive inventory of items at any facility or unit within the distribution network at any time. The predictive inventories may be generated in real-time, and updated as inputs to the real-time tracking system 100 change. The predictive inventories can be provided to users, internal and external to the distribution network in real-time, via user interface described elsewhere herein.

Upon receipt of an item into the distribution network, either via an electronic manifest or physical receipt, the predictive workload module 126, can predict all handling events for the item through delivery. As each items handling events are predicted, the real-time tracking system 100 can see the predicted path for each item, and identify any potential efficiencies or issues as the item moves through the distribution network.

A service performance module 128 provides a way of monitoring and reporting real-time service information to internal and external stakeholders, allowing for immediate and better-informed decision making. The service performance module 128 interfaces with the data warehouse 110 and requests specific item information according to the desired performance evaluation or inquiry. The service performance module 128 can provide alerts to mailers, shippers, facility personnel, and the like regarding pending and upcoming inefficiencies in processing. The service performance module 128 also provides diagnostics which allow a distributor, carrier, shipper, or other organization to identify and diagnose causes of service performance loss, through use of analytical tools and reports. The service performance module 128 provides the capability to predict and alert personnel to potential issues that may impair service performance. The service performance module 128 enables monitoring and reporting metrics regarding scan percentages of items, trays, and containers at each stage of the mail delivery process.

In some embodiments, the real-time tracking system 100 provides service performance measurements (SPM) which enable a distributor, carrier, shipper, or other entity to determine the time it takes for an item to move from origin to destination compared to the service standard. SPM may also include real-time indications an alerts of service performance issues, and enable diagnosis of service performance issues. In some embodiments, SPM includes providing alerts of impending service issues to users of the system, before the issues actually occur. The impending service issues can be determined or predicted based on item information and handling event information. For example, if the real-time tracking system 100 predicts a given mail volume for a certain facility at a certain time, but the real-time tracking system 100 also realizes that insufficient item processing equipment 212, personnel, or transportation resources are available, the real-time tracking system 100 can provide an alert to users of the real-time tracking system 100 to take action before the certain time arrives, and resources are insufficient to handle the incoming or outgoing items from the certain facility.

In some embodiments, the service performance module 128 provides service performance diagnostic (SPD) tools. SPD tools are configured to enable distribution network personnel to monitor service performance, identify potential service performance risks, and determine the root cause of service issues when they arise. The SPD tools can be available on a website, a dedicated computer, a mobile application, or any other desired platform, and may provide updates, such as periodic email, SMS messaging, real-time alerts, and the like containing service performance information. The SPD tools have access to the comprehensive and real-time item tracking data and service performance data for all items via the service performance module 128 and accessible from the data warehouse 110. In some embodiments, diagnosing service performance determines an item cycle time—the elapsed time between two handling events—obtained from the data warehouse 110. The service performance module 128 can calculate and store the item cycle time between adjacent handling events and designated handling event pairs. The service performance module can calculate cycle time statistics to characterize the distribution of item cycle times and the corresponding on-time performance of the items.

In some embodiments, the service performance module 128 provides scan metrics (SM). SM is the measurement of the visibility of item handling events. The service performance module 128 enables an entity to monitor and report metrics regarding handling event visibility for all items, handling units, container objects, etc. SM is calculated for each item, handling unit, container object, or other entity in the item life cycle. For each handling event, and the service performance module 128 can generate and display charts/graphs that compile scan percentages. This view of scan metrics provide effective monitoring and control of scan performance, and allows for improvements in operational performance.

In some embodiments, the service performance module 128 calculates two main scan counts: 1) captured and 2)

expected. A captured scan count may be defined as the number of items that received a scan or handling event. A separate count will be tracked for expected and unexpected captured scans. An expected scan count is defined as the predicted number of items or mail objects that should receive a handling event; an unexpected scan count is defined as the number of mail objects that received an unpredicted handling event. Two formulas for Scan Metric Scores are as follows:

$$\frac{\text{Captured Scan Counts for Expected Scans}}{\text{Expected Scan Count}} =$$
$$\text{Scan Metrics Score Excluding Unexpected Scan Counts}$$

$$\frac{\text{Captured Scan Counts for All Scans}}{\text{Expected Scan Count} + \text{Unexpected Scan Count}} =$$
$$\text{Scan Metrics Score Including Unexpected Scan Counts}$$

Tracking and service performance measurement business rules and calculations can process the information provided by the data warehouse 110 in real-time, to provide up-to-date end-to-end visibility and service level information based upon item handling events. Additional processing logic process the information for service performance diagnostics, item inventory, predictive workloads, visibility metrics, and customer reporting and analytics system functionality.

The real-time tracking system 100 also includes application modules 130. The application modules 130 provide a means of viewing, reporting, customizing, and accessing the business intelligence of the item data that is collected and processed by the data warehouse 110 and functional modules 120. The application modules 130 may include business intelligence (BI) module 132. BI module 132 provides real-time access to data, standardized and customizable reports, and other features through a unified, common system interface designed for ease-of-use. The data provided by the BI module 132 may be provided by or retrieved from the data warehouse 110, or from one or more of the functional modules 120. BI module 132 provides internal and external users with a single point of access to all of the information about the mail that is processed by the functional modules 120 of the real-time tracking system 100. BI module 132 may be accessible via portals 140, which may be user interface on various platforms or devices such as a website, a mobile application, a dedicated terminal, a computer accessible over a wired or wireless network in communication with the data warehouse 110.

In some embodiments, the BI module 132 allows a user to generate a customized user interface, which can be available to a user's customers via a website or mobile application owned or provided by the user. In this case, the BI module 132, in conjunction with provided APIs, can allow a user to access data from the data warehouse 110 for use on or in the user's own systems. The BI module 132 can also provide a user with a configurable dashboard, reports, queries, and alerts. The BI module 132 is configured to allow the user to analyze, manipulate, or trend data regarding the user's items, in whatever way the user wants.

The user interface may be in communication with the functional modules 120, application modules 130 and the data warehouse 110 via portals 140. The user interface may be generated by the distribution network or by a third party, developer, user, or another entity desiring to access the real-time tracking system 100. The user interface allows customization of system preferences, including options to set delegation access in profile settings, manage subscriptions, navigate to other distributor, carrier, or shipper webpages, and view favorite queries and reports. The BI module 132 may have a dedicated user interface which can also provide access to a data analytics module 133, a data provisioning module 134, and an enhanced data access (EDA) module 135.

The data analytics module 133 provides an advanced analytics engine to process mail information for complex functions such as prediction, optimization, modeling, simulation, and forecasting. Using data from the data warehouse 110, the analytics engine allows users of the system to customize views of data for operations analysis and planning, such as predictive workload analysis, network and delivery optimization, cost analysis, and revenue assurance.

In some embodiments, the data analytics module 133 can compare a shipper or mailer's item inventories from their submitted electronic manifests to actual incoming items from the mailer or shipper. The data analytics module 133 can determine a mailer or shipper's manifesting accuracy, and provide this information to the shipper or mailer. Manifesting accuracy can also be used as an input to the predictive workload module 126 for predicting incoming mail volume and for workload determinations. For example, if a mailer or shipper has an accuracy of 95%, or if the mailer or shipper routinely provides more items than are on the manifest, the predictive workload module 126 can take this information into account when determining a predictive item inventory for a facility which receives the mailer or shippers items. The predictive workload module 126 can add a calculated quantity of items to the predictive inventory, or can build in time to the predictive workload to account for the errors between the electronic manifest and the actual received items.

The data provisioning module 134 provides multiple methods of sharing information about the items and information available in the data warehouse 110 and functional modules 120 with internal and external users of the system. This includes access to standard application programming interfaces (APIs) and an environment for development of new services that provide customized queries, reports, and views of item data to users of the system, hosted within a distributor, shipper, or carrier environment. The data provisioning module 134 can be used to control access to the information and to provide information to entities with appropriate access. In some embodiments, the data provisioning module 134 can provide an entity access commensurate with the entity's interest, ownership, or permissions in accessing the information.

For example, a shipper or mailer may request access to item information. For privacy concerns, and for other reasons, the distribution network may not desire to share information about every item in the distribution network, but only about items which were sent by, owned by, or otherwise associated with the shipper. To illustrate, a mailer may be assigned a mailer ID, which is encoded in computer readable codes on items. When the mailer requests access to item information via the portals 140, the data provisioning module 134 may request, via a user interface, the mailer ID. Upon receipt of the mailer ID, the data provisioning module 134 authorizes access to and provisions data for items which were scanned or identified using a computer readable medium encoding the mailer's mailer ID. In this way, the mailer only has access to items which the mailer has mailed, and on which the mailer is identified.

In some embodiments, the real-time tracking system can associate items to a mailer or shipper based on an equivalent or corresponding computer readable code. For example, a mailer or shipper may provide an item having a computer readable code, such as an IMb™ (such as that used by the United States Postal Service), encoding a mailer ID or shipper ID. the distribution network may re-label the item for ease of processing, uniformity, or for other reasons. When the distribution network re-labels an item, the re-label code is provided to the real-time tracking system 100 by the piece of item processing equipment which performed the re-labeling. The real-time tracking system can store an association between the originally provided IMb™ and the re-labeled computer readable code. In this way, if either code is scanned as the item moves throughout the distribution network, the item information can be updated in the data warehouse 110, and the real-time tracking system can associate the item with the mailer or shipper.

In some embodiments, a recipient may request access to the real-time tracking system to view the status, type, and quantity of items intended for delivery to the recipient. By imputing a recipient identifier, such as the recipient's mailing address, or other unique identifier, the data provisioning module 134 can request information from the data warehouse 110 through one or more of the functional modules 120, regarding each item intended for delivery to the recipient.

In some embodiments, a shipper, such as a commercial retailer, an online marketplace, or any other entity may wish to access the visibility information for items in which they have an interest. The data provisioning module 134 may request item information for each item which was sold by the retailer, processed through the online marketplace, originated at a particular location, or any other desired information. The data provisioning module 134 is configured to identify each item associated with the criteria provided by the shipper, retailer, online marketplace, etc. by using a unique identifier, an origin address, a shipper identification, or any other unique identifier which is provided by the entity or which is encoded on the item.

The data provisioning module 134 may also comprise security features which require authorization or authentication of a user or entity before item visibility information can be provisioned or provided to the user or entity.

The EDA module 135 provides internal and external users with access to a non-production instance of the Data Analytics, BI, and Data Provisioning tools in a dedicated environment. Within this environment, authorized advanced users of the system can extract item visibility data from the data warehouse 110 to create customized reporting objects. These objects can be saved in this environment, with users having the ability to "publish" and share their reports within a community of other EDA module 135 users. EDA users, such as the mailing industry, with a cost-effective means of analyzing item data with minimal technology investment. The EDA module 135 can be an interface with an entity which allows an authorized entity to access the data stored in the data warehouse 110, and provides a suite of APIs which enable entities to create applications and/or programs for accessing the data generated by the real-time tracking system 100. The EDA module 135 can be embodied on a computer having a memory and a processor. The EDA module 135 can be embodied on the supercomputing system which comprises the real-time tracking system 100. The EDA module 135 is in communication with the data warehouse 110. The EDA module 135 can provide a "sandbox" functionality for third-parties, developers, or other interested entities to access and manipulate the data stored in the data warehouse 110. Sandbox functionality can provide sample item data, or actual item data from the data warehouse 110, and provide an interface for third-party developers to access sample or actual data to understand how to access, retrieve, request, provision, manipulate, and otherwise use data from the data warehouse 110, which knowledge can be implemented by the third-parties and developers for use in applications, web sites, and other programs. These third-parties and developers may make applications, web sites, or other programs available to consumers, users, mailers, shippers, or other entities who want to track items, receive business intelligence, receive performance data, generate predictive workload data, and the like.

The application modules 130, including the BI module 132, are accessible via portals 140, some of which may be external or available to users and customers of the distributor, shipper, or carrier, and some of which may be internal, or available to groups, units, personnel, or other entities within the distributor, shipper, or carrier.

The real-time tracking system 100 described herein provides capabilities for item tracking, analytics for predictive workloads, service performance measurement, service performance monitoring, Alerts, and Diagnostics, Scan Performance Measurement, Data Provisioning and Reporting, and Informed Visibility Interfaces.

Data Provisioning and Reporting provides access to standard and ad-hoc reports, as well as reports based on customer preference, that draw from a single source of data transmitted and stored in real-time. Informed Visibility Interfaces provides interfaces that provide access to a single source of information to support mail tracking, service and scan performance, and analytics. Provides users with the ability to choose the type and amount of data to receive, which provides greater flexibility in reporting and in integration with other customer systems. Improved interfaces also provide users with the ability to manage the delegation of access to data by other users, to manage subscriptions, and to access performance dashboards.

In some embodiments, the real-time tracking system 100 is configured to track an item throughout the item life cycle, or, in other words, at each stage in the item processing stream. During processing, packaging, transportation, and in other stages of the item life cycle, the item may be put into various groups, aggregations, containers, trays, or handling objects having a similar characteristic, such as type, origin, destination, etc. In order to track each item throughout the item life cycle as they are put into various containers, groups, etc., the real-time tracking system 100 creates nesting and de-nesting associations and operations. To illustrate, an item is received in a processing stream. A handling unit is created when items are placed into an empty tray, tub, container, sack, or other handling device, and a unique label is applied to the handling device. A handling unit may be a physical unit containing more than one item. A handling unit may also be a logical unit employed in the data warehouse 110 to identify a nesting association. When items are put into the handling unit, nesting associations are created between the items and the handling unit. For example, each item is nested into the handling unit by associating a unique identifier for each item with an identifier on a unique tray label. In this way, as the tray is processed and scanned, the data warehouse 110 receives handling information for each item nested in the handling unit. The handling unit, with its nested items inside, can be sorted, processed, or staged.

In some embodiments, a handling unit may be put in a composite object. A composite object may be an object which receives more than one handling unit, such as a container, truck, airplane, train car, etc. During handling, the handling unit can be nested into a composite mail object, such as into a container. The container is tracked through the life cycle using a unique identifier on the container, such as a container placard. As handling units are nested into the container, nesting associations between the handling units and container are created. The composite object is handled, for example, by being transported, loaded, or unloaded. So, too are the nested handling units and the nested items tracked as their associated composite object is handled. Each time a handling unit or composite unit is scanned, the data warehouse 110 receives the scan information. Any nesting associations for items associated with the scanned handling unit or composite unit are identified, and record information for the items are updated in accordance with the scan information. For example, if a composite unit is scanned on intake into a regional distribution facility, each data record for item having a nesting association associated with the composite unit is updated to reflect the intake location of the regional distribution facility. In this way, the progress of each item, such as each individual mailpiece, can be tracked throughout the distribution process, even though each item is not individually scanned at each location or facility.

When the composite object nears its destination, the handling units are de-nested from the container, and the nesting association between the handling unit and the container ends. The handling unit continues to be processed as it makes its way toward its destination. When the handling unit has served its purpose of transporting the nested mailpieces, the individual items are de-nested from the handling unit, and the nesting associations between the handling unit and mailpieces end. The items continue to be processed as they make their way toward their destination. After all of the items are de-nested from the handling unit, the unique tray label is removed from the tray, tub, container, or sack. The associations are only valid for the time period in which the nested item or handling was physically inside the handling unit or composite mail object.

Figure 2:
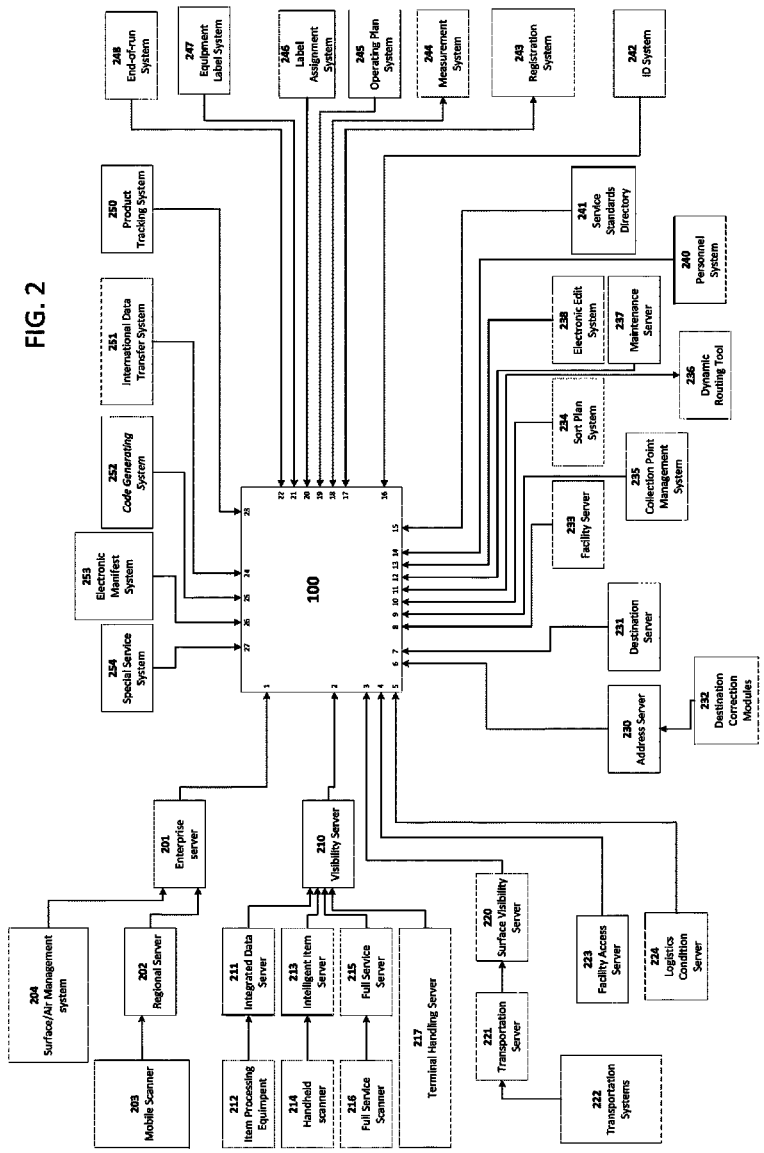
FIG. 2 depicts a block diagram of an embodiment of the inputs into a system for real-time tracking of distribution items.

FIG. 2 depicts an embodiment of inputs into the system for real-time tracking 100 of distribution items. The inputs depicted in FIG. 2 provide the information to the real-time tracking system 100 which enable the real-time tracking system 100 to provide the functionality, features, and services described herein.

The real-time tracking system 100 receives an input from an enterprise server 201. The enterprise server is a regional server which receives inputs from a variety of sources, and acts as a single point of information for these sources to the real-time tracking system 100. The enterprise server 201 receives scan information from a regional server 202, which is connected to mobile scanners 203. The mobile scanners 203 may be in wired or wireless communication with the regional server 202. The mobile scanners 203 may be carried by a delivery entity, such as a carriers. The mobile scanners 203 are configured to scan computer readable codes on items, and transmit the computer readable codes and any encoded information to the regional server 202. The mobile scanners 203 may also be enabled with GPS functionality. The mobile scanners 203 may also transmit the GPS location to the regional server 202 in real-time, or near real-time. This enables the real-time tracking system 100 to track each carrier or vehicle as it moves through the distribution network.

To illustrate, a carrier, such as a mail carrier or other delivery entity, may arrive at a unit delivery facility, and receive a mobile scanner 203. The carrier can use the mobile scanner to scan each item when the item is put on a truck. This scan information is received into the mobile scanner 203, and is communicated in real-time, or near real time to the regional server 202. The regional server 202 receives scan information from a plurality of mobile scanners 203, and communicates all the scan information to the enterprise server 201. The enterprise server 201 communicates the scan information to the real-time tracking server 100, where it is stored, processed, manipulated, or otherwise utilized by the data warehouse 110 or other components.

As the carrier delivers each item to each destination, the carrier scans the item using the mobile scanner 203, and indicates the item is delivered. The delivery scan information is communicated to the real-time tracking system 100 as described above. Each enterprise server 201 may receive inputs from a plurality of regional servers 202, and each regional server may receive inputs from a plurality of mobile scanners 203. In some embodiments, each carrier may have a uniquely identifiable mobile scanner 203. In some embodiments, the carrier must log in or otherwise identify him/herself to the mobile scanner 203. The identity of the carrier may also be communicated to the real-time tracking system 100.

The enterprise server 201 may also receive inputs from surface/air management systems 204. The surface/air management systems 204 may be operated by the distribution network, or may be third party services provided by air transport services to coordinate surface or air transport of items from various sources or distribution networks. The surface/air management systems 204 may provide information regarding the transport vehicles onto which items are loaded, estimated pick-up times, and delivery schedules for air or surface transport equipment and/or vehicles to the real-time tracking system 100 via enterprise server 201.

A visibility server 210 provides item scan and visibility information to the real-time tracking system 100, which occur primarily with item handling events. The visibility server 210 may be similar to the enterprise server in that it gathers information from various inputs and provides the information to the real-time tracking system 100. An integrated data server 211 provides item scan information to the visibility server. The integrated data server 211 receives inputs from a plurality item processing equipment 212. The item processing equipment 212 also communicates a unique identifier which identifies each piece of item processing equipment 212. This unique identifier is transmitted to the real-time tracking system 100, where an association with the item information and item processing equipment 212 unique identifier is made. This enables the real-time tracking system 100 to determine where an item is located when each item processing equipment 212 scan occurs. Each scan may also be categorized or defined as a particular handling event. For example, if the scan of the item occurs on the intake or ingress of the item, the handling event may be the induction scan, and the handling event description is provided to the real-time tracking system 100 and stored in the data warehouse 110. Each piece of item processing equipment 212 identifies and communicates the handling event type. In some embodiments, the handling event may be a nesting event, a de-nesting event, a processing event, transportation event, such as loading on a train, plane, truck, etc., a sorting event, a delivery event, a loading/unloading event, a rerouting event, and any other handling event which occurs as an item moves through the distribution network. The type of event may be stored in an item record in the data warehouse 110. The item record may include the computer readable code, any item information from an electronic manifest, an item service class, a shipper or mailer ID, a destination, and any other information received from the item.

In some embodiments, each item will undergo a similar progression of handling events. For example, most items will undergo handling events which include intake or ingress, arrival at origin facility, processing at origin facility, nesting events, transportation to transfer point (e.g., a regional processing facility), arrival at transfer point, processing at transfer point, transportation to destination plant, arrival at transportation plant, transportation to delivery unit, de-nesting events, arrival at delivery unit, processing at delivery unit, item out for delivery, and delivery. These are exemplary only, and an item may undergo more or fewer handling events, without departing from the scope of the application.

In some embodiments, the item processing equipment 212 comprises an item imaging device, such as a camera, which can perform optical character recognition, or which captures an image of the item which can later be optically character recognized. The item image, or data derived from the item image can also be provided to the visibility server 210 and, subsequently, to the real-time tracking system 100.

The visibility server 210 also receives input from an intelligent item server 213, which receives input from one or more handheld scanners 214. The handheld scanners 214 may be used by employees or personnel in a receiving facility, such as in a post office, or on intake into a regional distribution facility. When an item is received into the distribution network, or into a distribution facility, each item can be scanned with a handheld scanner 214, which reads the computer readable label on the item, and communicates the item information to the intelligent item server 213. The handheld scanner 214 may also be used to scan items as they are placed on trucks in a facility, either for transportation to an intermediate facility, or going out for delivery. The handheld scanner 214 can also scan a computer readable identifier on the truck on which the item was loaded. The handheld scanner 214 provides the item scan information and the truck identifier to the visibility server 210, which in turn, provides the information to the real-time tracking system. The handheld scanner 214 may also transmit an identifier of a location where the handheld scanner 214 is used. Each handheld scanner 214 may also provide to the visibility server 210 a handheld scanner identifier which identifies the scanner, and which can be associated with an employee identification which identifies the employee which operated the handheld scanner 214.

The visibility server 210 receives input form a full service server 215, which interfaces and receives information from a one or more full service handheld scanners 216. The full service server 215 and full service handheld scanners 216 may be owned/operated by a third party, such as a mailer, shipper, or other similar entity. When a mailer or shipper ships many items, the mailer or shipper prepares an electronic manifest or documentation regarding a shipment. The mailer or shipper may scan computer readable codes on each item as the shipment is being prepared to create an electronic manifest. In some embodiments, the mailer or shipper may scan each item to verify the electronic manifest is complete. The electronic manifest, and the scan information from the full service handheld scanners can be provided to the full service server 215, and, in turn, provided to the visibility server 210. An electronic manifest provided to the real-time tracking system 100 can identify a mailer or shipper by a mailer or shipper ID, or it can uniquely identify the mailer or shipper by a customer registration identifier, or other unique identifier. The real-time tracking system 100 associates the customer registration identifier or other unique identifier with a mailer ID or shipper ID which is applied to the mailer or shipper's items.

The visibility server 210 can receive inputs from one or more terminal handling servers 217. The terminal handling servers 217 may receive scan information from air or surface transporters as the items are scanned and loaded on to vehicles for transport. The terminal handling servers 217 may also transmit unique identifiers to identify the vehicle on which each item has been loaded. The scan information from the terminal handling servers 217 may be transmitted via the visibility server 210, and to the real-time tracking system 100.

The real-time tracking system 100 can receive an input from a surface visibility server 220. The surface visibility server may receive scan and visibility information from a transportation server 221, which, in turn, receives inputs from a variety of transportation systems 222. The transportation system 222 may comprise a yard management system which records, tracks, and provides the availability of ground transportation resources associated with a particular location within the distribution network, such as the number of trucks available for use at a particular regional distribution facility. The transportation systems 222 also provide unique identifiers for each of the delivery assets, such as vehicles, which can be accessed by the transportation server 221, and ultimately, the real-time tracking system 100. These unique identifiers for delivery assets physically identify each delivery asset when the real-time tracking system 100 receives a delivery asset identifier from the enterprise server 201 or the visibility server 210. The transportation system 222 also provides GPS information regarding the location of each transportation asset.

The transportation systems 222 also provide information to the real-time tracking system 100 regarding availability of delivery assets and GPS location of delivery resources for use in predictive workload determinations and the like.

The real-time tracking system 100 also receives an input from a facility access server 223. The facility access server provides a mailer or shipper with an interface to schedule a delivery time to an intake facility. For example, a mailer may have a plurality of items to which it has applied a computer readable identifier, and for which an electronic manifest has been provided. The facility access server 223 receives input of a scheduled drop-off time and location for the mailer to alert the distribution network of the incoming inventory. The real-time tracking system 100 may use this information in its inventory management, predictive workload determinations, and other processes.

The real-time tracking system 100 also receives inputs from a logistics condition server 224. The logistics condition server receives information regarding delivery vehicles and transportation resources, including maintenance status, break-down status, GPS location, and the like. This vehicle status information is supplied to the real-time tracking system 100, where it can be used in predictive workload determinations, inventory predictions. The GPS location information of vehicles from the logistics condition server 224, along with the unique identifiers for the vehicles can be used for real-time or near real-time tracking of items as they move through the distribution network. The real-time tracking system 100 can have the GPS coordinates of each facility stored, or provided from an external source. As the transportation resources GPS location is tracked, a geofencing system is employed on the logistics condition server 224 to send an alert or a notification to the real-time tracking system 100 when a transportation resource comes near to a facility or within a geofence established around a facility. The real-time tracking system 100 can use this information in predictive workload determinations, for item tracking, and inventory determinations.

The real-time tracking system 100 receives inputs form an address server 230 and destination server 231. The address server 230 receives input from destination correction modules 232. The destination correction modules 232 provide information regarding address correction, mail forwarding, and other item redirection services. These inputs into real-time tracking system 100 can be used in inventory calculations and predictive workload determinations. These can also be used in service performance measurements to improve the efficiency of item processing. The destination server 231 provides destination identifier codes. Each computer readable code contains an encoded destination identifier. In the case of the postal service, that destination identifier may be a ZIP code. The destination server 231 identifies to the real-time tracking system 100 what the encoded destination identifiers are, and what the physical destinations are, which are received in scans from the visibility server 210.

The real-time tracking system 100 receives inputs from a facility server 233. The facility server 233 contains information regarding the facilities in a distribution network. For example, the facility server 233 provides the real-time tracking system 100 with a description of the type of facility, the item processing equipment 212 at the facility, the size of the facility, i.e., how many truck bays, floor space, staging areas, etc., and other facility information. As the real-time tracking system 100 performs predictive workload determinations for a particular facility, the real-time tracking system 100 needs to know what item processing equipment 212 is located at a particular facility, in order to determine run time, what equipment must be used and for how long, etc.

The real-time tracking system 100 receives input from a sort plan system 234. The sort plan system 234 describes what each time of item processing equipment 212 is capable of, the capacities, speed, and other information regarding operation of the item processing equipment 212. The real-time tracking system 100 uses this information to calculate predictive workloads and to schedule facility operation.

The real-time tracking system 100 receives input from a collection point system 235. The collection point management system 235 provides information regarding collection points, collection times at each collection point, physical location of the collection point, and other information regarding collection points. If the distribution network is the postal service, a blue postal box on a street corner may be a collection point. The collection point system 235 informs the real-time tracking system 100 of when the collection point pick up time is, and may provide a confirmation of pickup. For example, if a carrier is picking up items from a collection point, the items are scanned via the mobile scanner 203. A collection point, e.g., blue box, identifier is also scanned using the mobile scanner 203. The real-time tracking system 100 receives the collection point identifier, and uses the input from the collection point system 235 to identify the collection point from the collection point identifier, and to determine what the physical location of the collection point is. In some embodiments, the real-time tracking system 100 may compare the GPS coordinates of the collection point with GPS coordinates provided by the wireless scanner 203, to determine if the carrier is on schedule, is in the right place, and make any other desired determination using this information.

The real-time tracking system 100 also receives input from a dynamic routing tool 236. The dynamic routing tool 236 can be used to prepare dynamic routes at any level of the distribution network, and can be used in determining inventory, predictive workloads, and the like.

The real-time tracking system 100 receives inputs from a maintenance server 237. The maintenance server provides maintenance information, such as maintenance status, malfunction or repair status, preventive maintenance schedules, and other maintenance information for item processing equipment 212. This information can be used in predictive workload determinations to take into account item processing equipment 212 availability in order to accurately predict or analyze what the run time, personnel, and other requirements will be in a given facility.

The real-time tracking system 100 receives inputs from an electronic edit system 238, in which a carrier or other resource can input information regarding a particular destination. For example, a carrier may note that no one is home at a particular destination, or that a destination has requested no delivery or alternate delivery instructions. This information is provided to an electronic edit system 238, from whence it is provided to the real-time tracking system 100. This information can be used in predictive workload determinations and inventory determinations to prevent or change delivery for affected destinations.

The real-time tracking system 100 receives inputs from a personnel system 240. The personnel system 240 contains information regarding staffing, schedules, available employees, identification of employees who are clocked in or at work, and other human resource related information. This information is used by the real-time tracking system 100 in predictive workload determinations for identifying what personnel is available, or will be available at a given facility at a given time. This is used to determine what item processing equipment 212 can be operated or run based on the number of operators available.

The real-time tracking system 100 receives input from a service standards directory 241. The service standards directory 241 contains information regarding the item service classes. The computer readable identifiers on items may contain an item service class identifier. Service classes may have different processing requirements and timing requirements. When an item scan is received from the visibility server 210, the visibility server 210 provides the computer readable code with an item service class encoded therein. The real-time tracking system 100 cross-references the item service class code with the item service class identified by the item service class code. Thus, the real-time tracking system 100 generates and stores item service classes for use in predictive workload or inventory determinations.

The real-time tracking system 100 receives inputs from an ID system 242. The ID system 242 stores identifiers for mailers, shippers, retailers, or any other entity which has an identifier which can be encoded into computer readable codes located on items. When a computer readable code is received from the visibility server 210, the computer readable code may contain or encode a mailer or shipper ID. The real-time tracking system 100 cross-references the encoded mailer or shipper received from the visibility server 210 with the identity of the mailer or shipper from the ID system 242, and stores an association between the item and the mailer or shipper. The real-time tracking system 100 may use this information to provide tracking information, business intelligence, or other SPM information regarding the items identified by the mailer or shipper ID. Although the mailer and shipper ID are described here, the ID encoded in the computer readable code on the item may refer to any desired entity, such as recipient, item owner, commercial retailer, and the like.

The real-time tracking system 100 receives input from a registration system 243. The registration system can provide information regarding entities which have registered and been authenticated to receive and/or use information from the real-time tracking system 100. The registration system 243 may provide associations between a user and the user's mailer ID, delivery addresses, or other identifying feature. The registration system 243 may also provide permissions that a mailer or shipper to share its information with a third party. The data provisioning module 134 receives the information from the registration system 243 as it determines what item information is available to which parties. In some embodiments, a mailer may provide mailing services for many clients. The mailer may provide the registration system 243 with the identities of the clients, and authorize the clients to receive particular item information, or information for items with a particular identifier, destination, return address, intake point, etc. The mailer or shipper may delegate access permission to a third party or other user. This permission allows the client to access the item information for the mailer ID, which is authorized for sharing by mailer. The data provision module 134 can access information from the registration system 243 in order to authenticate and authorize registered users access to data in the data warehouse 110.

The real-time tracking system 100 provides information to and receives input from a measurement system 244. The measurement system 244 may be operated by the distribution network or by an entity which specializes in service performance measurement statistics or other entity. The real-time tracking system 100 provides scan metric data, performance measurement data, and other analytical data, to the measurement system 244. The measurement system 244 may perform various analyses on the received data, and may provide feedback to the real-time tracking system 100 based on various analyses. This feedback may be used to improve efficiency of the real-time tracking system 100, or be provided to external users via the ports 140.

The real-time tracking system 100 receives input from an operating plan system 245. The operating plan system 245 provides entry clearance times, run start and stop times, and other timing requirements for each facility. For example, an entry clearance time can be a deadline by which a particular item, handling unit, or consolidated unit must be processed or cleared from a facility in order to meet a service class deadline, an air transport deadline, or other delivery deadline. The operating plan system 245 also provides the run start and stop times for various facilities. The real-time tracking system 100 uses the entry clearance times in predictive workload determinations, using the entry clearance time to determine what equipment, personnel, etc. are needed in order to process items in order to meet an entry clearance time deadline. The real time tracking system 100 uses run start and stop times from various facilities in order to understand timing between various facilities. For example, if a destination facility has a run start time constraint, and items are being transported from one facility to the destination facility, the real time tracking system 100 needs to know the time by which the items must be processed and placed en route to the destination facility in order to meet the run start time requirement of the destination facility. This information is used when predicting and determining equipment, vehicle, and personnel needs at each facility in the distribution network.

The real-time tracking system 100 receives inputs from a label assignment system 246. The label assignment system 246 stores unique identifiers for each container, handling unit, consolidated unit, tray, sack, pallet, or other item handling component, and associates the unique identifiers with the particular piece of equipment. Thus, when a scan of a handling unit is received from the visibility system 210 or the enterprise server 201, the real-time tracking system 100 cross-references information from the label assignment system to interpret scans of handling units, trays, containers, pallets, etc., and identify the particular handling unit, container, tray, etc. This information is used in tracking nesting associations, in item tracking, and in any other desired application. The real-time tracking system 100 also receives input from an equipment label system 247. The equipment label system is used to generate computer readable codes for item processing equipment 212 and mail handling equipment.

The real-time tracking system 100 receives input from an end-of-run system 248. The end-of-run system 248 is a system which each piece of item processing equipment 212 undergoes at the end of its run. The number of scans, misfeeds, equipment processing speed, throughput, and other statistics are compiled, and provided to the real-time tracking system 100, along with the identifier for the piece of item processing equipment 212. The real-time tracking system 100 uses this information to adjust the predictive workload calculation to more accurately reflect the capabilities of any piece of item processing equipment 212.

The real-time tracking system 100 receives input from a product tracking system 250. The product tracking system 250 provides manifest information for specific classes of items and for parcels and packages. The specific classes of items can include certified mail, or for items with specific tracking, notification, and insurance requirements. Where a distribution network offers delivery of items of mail and parcels may be processed and tracked using separate systems. The product tracking system 250 may provide information regarding parcels and packages, including parcel weight, volume, size, type, sender, receiver, special handling requirements, or any other desired parcel information. The real-time tracking system 100 may use this information in creating inventories, in predictive workload determinations, in SPM, and in BI applications.

The real-time tracking system 100 receives input from an international data transfer system 251. The international data transfer system 251 includes information regarding items which originate internationally or are intended for delivery internationally. A domestic distribution network, such as a postal service, may interface with international distribution network, such as a foreign post office. When items are intended for international delivery, the foreign distribution network provides item information, such as electronic manifest information, item identification, item type, item quantity, and the like, to the international data transfer system 251. This information is provided to the real-time tracking system 100, where it is used in inventory and predictive workload determinations, and in other desired applications.

The real time tracking system 100 receives input from a code generating system 252. The computer readable code generating system is configured to generate computer readable codes which can be attached to items for use in the distribution network. The distribution network may provide individuals, businesses, shippers, and other entities the ability to generate computer readable codes, which the individuals, businesses, shippers, and other entities can affix to items which they prepare or provide to the distribution network for shipment or delivery. Using a code generating system 252, an entity can input item information, item service class, and other information regarding the item and request a computer readable code. The code generating system 252 generates the code, and provides the generated code and item information to the real-time tracking system 100. The real-time tracking system 100 uses this information for item tracking, inventory, SPM, predictive workload determinations, etc. When the item with the generated computer readable code is ingested or taken into the distribution network, the generated bar code is scanned with a mobile scanner 203, handheld scanner 214, or item processing equipment 212, and transmitted to the real-time tracking system 100 via the visibility server 210. The real-time tracking system 100 associates the item information received from the code generating system 252 with the scanned item, and associates a scan event, a scan location, and other scan information with the item in the data warehouse 110.

The real-time tracking system 100 receives input from an electronic manifest system 253. The electronic document system receives electronic manifests from mailers, shippers, or other entities who provide electronic documentation to the distribution network. The electronic manifest may include mailer ID, shipper ID, item type, item service class, item quantity, item destination, item ingress or induction point, any nesting associations generated by the mailer or shipper, and any other desired information regarding the shipment. This information is provided to the real-time tracking system 100 for determinations of inventory and predictive workloads, for tracking purposes, and for any other desired use. The electronic manifest system 253 may provide information regarding items of mail, such as flats, letters, and the like, in contrast to parcel or package information, which may be provided by a product tracking system 251.

The real-time tracking system 100 receives input from special service system 254. The special service system 254 may provide special request handling for particular items. For example, a mailer, shipper, or other entity may desire to provide a particular mailpiece to every address in a given area. In this case, the mailer need not address each individual item of mail. The mailer provides information to the special service system 254, which notifies the real-time tracking system 100 of the special circumstance, and provides the volume of the item to be delivered. This volume or quantity information can be used in visibility reporting, SPM, predictive workloads, inventory, etc.

In some embodiments, the distribution network may be the United States Postal Service. Based on all the above inputs, the types of data stored in the data warehouse can include item information, including item attributes; handling events; transportation location information, including GPS location data from carriers and transportation resources (trucks, cars, trains, etc.); nesting associations; manifest information, which includes item owner, preparer, drop-off location, job, and item and nesting associations; appointments and assignments, such as scheduled drop-off times, air transport appointments and assignments, etc.; reference data, which includes facility information, item processing equipment information, including maintenance schedules, carrier routes, service standards, critical entry times, holiday information, etc.; and aggregate data which has been aggregated by the real-time tracking system 100, including inventory, predictive workloads, SPM, SPD, etc.

The inputs described here are exemplary only. A real-time tracking system 100 may have more or fewer inputs that that described here without departing from the scope of this disclosure. Additionally, intermediate components, such as enterprise server 201 and visibility server 210 may be added or removed as desired without departing from the scope of this disclosure.

The data warehouse 110 and the real-time tracking system 100 are configured to handle large amounts of incoming and outgoing data on a daily basis. The real-time tracking system can handle an average of over 1.475 billion or more transactions per day. In the case of the United States Postal Service, of the 1.475 billion transactions, item processing equipment 212 generates 1.225 billion scans and 192 million mailpieces are identified. Table 1 provides additional estimated inbound data volume for the real-time tracking system 100 specific to the United States Postal Service. The portion of the distribution network providing the input is identified in parenthesis. These volumes are estimates only, and the real-time tracking system 100 may receive and process higher volumes of transactions than those shown here.

TABLE 1

| Interfaces | Transmitted Data | Type of Data | Frequency | Average Incoming Volume per Day |
| --- | --- | --- | --- | --- |
| Address Change Service (230) | Change of Address | Reference | Daily | 300,000 |
| Address Change Service (230) | Undeliverable as addressed | Reference | Daily | 270,000 |
| Facility Access and Shipment Tracking (223) | 99M (Container) | Transactional | 4x Daily | 18,716 |
| Facility Access and Shipment Tracking (223) | Customer Service Agreement (CSA) | Transactional | Daily | 586 |
| Facility Access and Shipment Tracking (223) | Destination Appointments | Transactional | 4x Daily | 6,673 |
| Facility Access and Shipment Tracking (223) | Mailer Direction File (MDF) | Transactional | Daily | 6,364,815 |
| Facility Access and Shipment Tracking (223) | Entry Origin Appointments | Transactional | 4x Daily | 225 |
| Facilities Database (223) | Facility data | Reference | Daily | 93 |
| Facilities Database (223) | Facility File | Reference | Daily | 38,389 |
| Full-Service Intelligent Mail Device (216) | Container | Transactional | Real-time | 1,679 |
| Full-Service Intelligent Mail Device (216) | Handling Unit | Transactional | Real-time | 3,513 |
| Full-Service Intelligent Mail Device (216) | Mailpiece | Transactional | Real-time | 24,149 |

TABLE 1-continued

| Interfaces | Transmitted Data | Type of Data | Frequency | Average Incoming Volume per Day |
|---|---|---|---|---|
| Intelligent Mail Visibility Service (210) | IMDAS Bundle | Transactional | Real-time | 646 |
| Intelligent Mail Visibility Service (210) | IMDAS Container | Transactional | Real-time | 3,526 |
| Intelligent Mail Visibility Service (210) | IMDAS Tray | Transactional | Real-time | 19 |
| Intelligent Mail Visibility Service (210) | MPE Scans | Transactional | Real-time | 1,255,926,786 |
| Intelligent Mail Visibility Service (210) | Mailpiece | Transactional | Real-time | 192,000,000 |
| Intelligent Mail Visibility Service (210) | Tray | Transactional | Real-time | 1,812,029 |
| Logistics Condition Reporting System (224) | plant-to-plant geofence | Transactional | Real-time | 400,000 |
| Logistics Condition Reporting System (224) | Terminal handler Scans | Transactional | Real-time | 250,000 |
| Mailer/Shipper ID (242) | Mailer identification data | Reference | Daily | 138 |
| Electronic Manifest (253) | Permit/customer registration ID | Transactional | Real-time | 1,175,606 |
| Electronic Manifest (253) | Electronic manifests | Transactional | Real-time | 1,765 |
| Electronic Manifest (253) | Mailing Arrival | Transactional | Real-time | 27,527 |
| Surface Air Support System (204) | Alt Loc | Transactional | Once | N/A |
| Surface Air Support System (204) | Assignments | Transactional | Every 30 minutes | 354,421 |
| Surface Air Support System (204) | Carrier | Transactional | Every 2 hours | 1,398,208 |
| Surface Air Support System (204) | FedEx | Transactional | Every 6 hours | 797,592 |
| Surface Air Support System (204) | Route Change | Transactional | Daily | 45,715 |
| Surface Air Support System (204) | Terminal handling service | Transactional | Every 2 hours | 751,693 |
| Service Delivery Calculator (241) | Service standards reference data | Reference | Daily | 49 |
| Surface Visibility (220) | Container (99M) | Transactional | Real-time | 53,721 |
| Surface Visibility (220) | Handling Unit | Transactional | Real-time | 300,117 |
| Transportation Information Management Evaluation System (222) | Postal vehicle service (PVS) and highway trips | Transactional | Hourly | 150,000 |
| Transportation Optimization Planning & Scheduling Tool (222) | Nightly planned routes | Transactional | Daily | 1,114,256 |
| Vehicle Information Transportation Analysis & Logistics (222) | PVS Trips | Transactional | Daily | 15,000 |
| Vehicle Information Transportation | PVS Truck Inventory | Transactional | Daily | 4,057 |

TABLE 1-continued

| Interfaces | Transmitted Data | Type of Data | Frequency | Average Incoming Volume per Day |
|---|---|---|---|---|
| Analysis & Logistics (222) Web End of Run (248) | End-of-Run | Transactional | Daily | 76,848 |
| GeoFence PVS Pings (224) | GPS data | Transactional | Real-time | 227,192 |
| GeoFence Carrier Pings (224 and 203) | GPS data | Transactional | Real-time | 4,800,000 |
| GeoFence HCR Plant - PO Pings (224) | GPS data | Transactional | Real-time | 600,000 |
| | | | Estimated Total Average Transactional Data per Day: | 1,475,513,557 |

Figure 3:
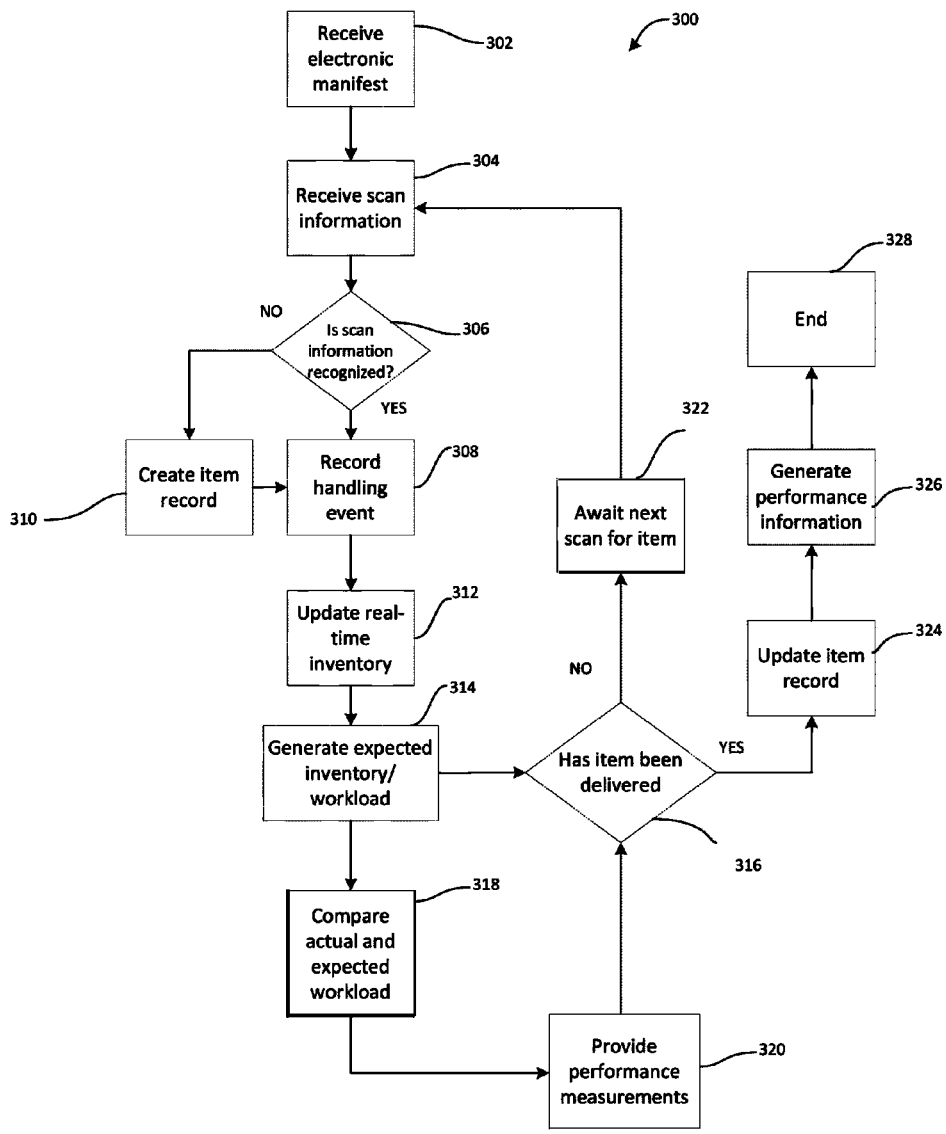
FIG. 3 depicts a flowchart depicting an embodiment of item processing in the real-time tracking system.

FIG. 3 depicts a flowchart depicting an embodiment of item processing in the real-time tracking system 100. The process 300 begins in step 302, where the real-time tracking system 100 receives an electronic manifest. As described above, the electronic manifest may be provided via a product tracking system 250, an electronic manifest system 253, or may be otherwise input into the real-time tracking system 100. It should be noted, however, that an electronic manifest may or may not be provided for a particular item. Process 300 can continue whether an electronic manifest is provided or not. in some embodiments, process 300 will begin in step 304. Additionally, process 300 is described here with regard to one or a few items, and as one process. However, in the case of a distribution network, such as a postal system, process 300 will be occurring many times in parallel, or will be occurring many times with different steps of process 300 occurring for different items at the same time. The real-time tracking system 100 may generate an item record for each item included on the electronic manifest.

The process 300 may start in step 304, or, if the process 300 started in step 302, the process 300 may proceed to step 304, wherein item scan information is received. As described above, item scan information can be received from a mobile scanner 203, a handheld scanner 214, item processing equipment 212, a full service handheld scanner 216, from the transportation system 222, and the like, upon scanning the physical item. As described above, the scan information includes a computer readable code, which is attached to or associated with the item, information regarding the device or equipment which performed the scan, including device/equipment type and location, and a handling event type. The scan information is received in the real-time tracking system 100 via one of the inputs described above.

The process next moves to step 306, wherein it is determined whether the scan information is recognized. To determine whether scan information is recognized, the real-time tracking system 100 compares the computer readable code with computer readable codes previously or concurrently received from the code generating system 252, the electronic manifest system 253, or from another input which provides a computer readable code.

If the scanned computer readable code is recognized, or has been received from another input, an item record may already exist in the data warehouse 110, but will not have a handling or scan event associated with it. If this is the case, the process moves to step 308, wherein the handling event, the equipment type/location, or any other relevant information is recorded in the data warehouse 110, and is associated with the item and the item record.

If the scanned computer readable code is not recognized in step 306, the item may not have been provided on an electronic manifest. If this is the case, the process moves to step 310, wherein an item record is created, and the scan information is stored and associated with the item record and the item. In some embodiments, an item may be received into a distribution network without a computer readable code attached. In this case, the distribution network may generate a computer readable code, input the code into the real-time tracking system 100, and then scan the item. When this occurs, the real-time tracking system 100 will recognize the code, and record the scan information in an item record, which can be created at the time of generating the computer readable code, or at the time of receiving scan information.

The process next moves to step 312, wherein the item record is used to update the real-time or near real-time inventory. The real-time inventory may be provided for each facility, handling unit, tray, container, etc., at any time. The data warehouse 110 stores scan information, handling events, etc. for each item. Using this information, the inventory module 124 can keep a real-time inventory, which can be provided via push notifications, email, SMS messages, website interfaces, and the like, to internal and external users via the portals 140.

The process next moves to step 314, wherein expected inventory or workloads can be generated. Using the real-time item information stored in the data warehouse 110, and using the other information input into the real-time tracking system 100, such as the transportation availability, item processing equipment availability and schedule, personnel schedules and availability, service classes, and historical information described above, the predictive workload module 126 generates predictive workload data for each facility, vehicle, carrier, etc. in the distribution network. For example, the data warehouse 110 contains information for each item in the distribution network, and with each item, is associated a next delivery point, such as the next facility through which the item needs to pass in order to be delivered to the destination. Thus, the predictive workload module 126 can provide a predictive inventory for each facility for any period of time. As described above, this information is used to calculate item processing equipment run times, personnel needs, vehicle needs, etc.

From step 314, the process 300 splits into parallel paths. However, in some embodiments, the path for providing service performance measurements may be delayed, not performed, or performed at some other time. One path of the process 300 leads to step 318, wherein the expected, or predictive workload generated in step 314 is compared to the actual received item inventory for a given facility. The comparison is used to determine whether the predictive workload determination is accurate, or if parameters need to be adjusted in order to provide a more accurate predictive workload.

The process moves to step 320, wherein performance measurements are generated, such as SPM and SPD described above, or any other desired performance measurement is generated. The performance measurements may be provided to internal and external users via the portals in real-time or near real-time. Or the performance measurement information may be compiled, stored, and batched to users upon request.

The process next moves from step 320 to decision state 316, wherein the real-time tracking system 100 determines whether an item has been delivered. The other path of process 300 leads to decision state 316, which functions as described below. In decision state 316, the real-time tracking system 100 determines whether an item has been delivered in order to understand where an item is during its life cycle in the distribution network. If the item has not yet received a delivery handling event, the item is still in the distribution network, and additional handling events or scan information is expected. In this case, the process 300 moves to step 322, wherein the real-time tracking system 100 awaits scan information for the item. The real-time tracking system 100 may have times stored associated with item scan events, and may have time guideposts which provide a range of time an item is expected to be at any point in the distribution network, such as, how long an item should take to transit from one facility to another. If scan information for an item has not been received within the estimated or standard time, the real-time tracking system 100 may generate a warning, a message, or communication to in internal or external user that an item is overly delayed, and prompt a person or system within the distribution network to take action to determine the cause of the delay.

When the next scan information is received at step 322, the process repeats for the item, until the delivery handling event is recorded. In this case, the process moves from decision state 316 to step 324, wherein the item record is updated with a delivery event, time, and location. The delivery event can be provided real-time to a recipient, shipper, mailer, or other interested party. In some embodiments, where the mobile scanner 203 is GPS enabled, a carrier's location may be tracked in the real-time tracking system 100. When the carrier approaches the GPS coordinates of a delivery location, or comes within an established geo-fence around a destination or other selected location, the real-time tracking system 100 may notify or alert an recipient, owner, etc., that the carrier is approaching the delivery point. Upon delivery, the carrier scans using the mobile scanner 203, and the carrier, or the mobile scanner 203 indicates that the scan is for a delivery. The delivery handling event is provided to the real-time tracking system 100, and the delivery event is recorded, and the item record is updated.

The process next moves to step 326, wherein performance information is generated. The performance information may include timeliness of delivery based on service class, scan information accuracy, any observations or comments from personnel in the delivery network, or any other desired performance information. The performance information for each item may be stored in the data warehouse 110 for later access by internal or external users.

In some embodiments, the distribution network may comprise the real-time tracking system 100 as described herein. By using the real-time tracking system 100, a distribution network is able to track and store information in real time, and/or near real time, regarding the origin, current location, last handling event, next handling event, intermediary stops, delivery destination, and delivery date/time estimate, for each item in the distribution network. The real-time distribution network can also know and/or track the identity of the sender, such as a bulk mailer, retailer, private party, etc. Using a unique identifier, such as a mailer or shipper ID, for each item, the identity of the sender can be associated with the item moving through the real-time distribution network. The distribution network may also know the identity of the item. The identity of the item can be determined from an electronic manifest provided by the sender or shipper of the item, or based on the identity of the shipper, or may be encoded in a unique identifier on the item.

As described above, the BI module 132, as well as any other module described herein, can comprises a processor and a memory, and can configured to analyze item identification and destination, and generate information to third parties or requesting entities. This BI module 132 may be embodied on a stand-alone computer, or may be a part of the data warehouse 110. The distribution network can keep and compile information regarding the number and identity of items which are delivered to a recipient on a daily basis. This information is collected and stored by under the direction of the processor of the data warehouse 110. For example, the data warehouse 110 is in communication with item processing equipment 212, such as sorting and handling machines, carriers, distribution facilities, and the like, via a wired or wireless network.

This information may be valuable to identify days of the week on which a particular recipient, or group of recipients, receives types of items. For example, the BI module 132 can analyze item information to determine on which day a particular recipient receives the most or fewest advertising items from mailers, or the most magazines or catalogs, or any other desired information. This information may be valuable to a mailer or shipper who wishes to send an item, such as an advertisement, which will be received on a day or at a time where the fewest competing advertisements may be received, in order to maximize the chance that a recipient will look at or act on the mailer's item or advertisement.

In some embodiments, as described above, the real-time tracking system 100 identifies and stores the identity of the sender and/or of an item in the data warehouse 110. The identity can be obtained from an identifier, such as a computer readable code, attached or affixed to the item. In some embodiments, the identity of the sender and/or item can be obtained by interpreting or decoding an identifier, and using the decoded or interpreted information to look up or query an identity associated with the identifier. The real-time tracking system 100 knows that an item is sent from a particular entity, such as an online retailer like Amazon, e-Bay, a catalog retailer, or any other retailer or entity, by receiving manifesting information or an identification unique to the sending retailer.

In some embodiments, the real-time tracking system 100 may associate the item's origin or return address with a particular sender. The BI module 132 can associate the return address or identity of a sender of an item with a category. The BI module 132 may categorize items for purposes of tracking or preparing shipping and receiving data. The BI module 132 may categorize potential distribution items, such as electronics, appliances, home furnishings, clothing, DVDs, CDs, office supplies, and any other desired category. In some embodiments, the distribution network may categorize potential distribution items by cost, such as high dollar items, low dollar items, etc. These categories are exemplary only, and one of skill in the art will understand that other categories or bases for categorization may be used without departing from the scope of the present disclosure.

The BI module 132 can associate retailers and the addresses of retailers' stores, distribution centers, warehouses, etc., in a memory with one or more categories of items. For example, the BI module 132 may associate an electronic goods retailer with the electronics and appliances, and a traditional department store with clothing, home furnishings, and others. When a return address of a shipping facility for a retailer, or the name of a retailer is read, scanned, captured, processed, or otherwise handled in the distribution network, the item may be associated in the data warehouse 110 or BI module 132 with a category of items. The BI module 132 can provide aggregated or compiled data of what types of items are delivered to recipients in a given geographical area. In some embodiments, the BI module 132 compiles item type information based on the identity of the retailer or sender without using an item category.

In some embodiments, a bulk mailer may have or may be assigned a unique mailer identification which is encoded or readable from the item as it travels through the distribution network. The BI module 132 is thus able to identify an advertisement, a catalog, a magazine, or other mailpiece based on the mailer or shipper ID. In some embodiments, the distribution network receives item identifying information from a sender's manifest information, which is supplied to the distribution network. In this way, the BI module 132 or the real-time tracking system 100 can track the identity of items, the types of advertisements, the types of catalogs, etc. which are delivered to particular geographic areas.

The BI module 132, by identifying the items or types of items which are delivered to recipients in the distribution network, can compile valuable information regarding the buying preferences, interests, and habits of a particular recipient or group of recipients. For example, the BI module 132 receives item information and destination information from the data warehouse 110. The BI module 132 comprises instructions on how to process, manipulate, compile, or otherwise evaluate the received information. The BI module 132 can categorize the items in a variety of different ways, e.g., according to dollar value of the items, frequency of item delivery, or any other desired category. The BI module 132 can extrapolate relative income levels of recipients or groups of recipients based on the types or the value of items received by the recipients or groups of recipients. For example, if a particular geographic area receives items which are categorized as high dollar items, the BI module 132 can extrapolate income levels or buying preferences based on these categories. If a geographic area subscribes to catalogs from high-end stores with a greater frequency than other areas, then the BI module 132 can extrapolate income levels or buying preferences based on the catalogs. These are examples only, and a person of skill in the art will understand, guided by the present disclosure, that the identity of distribution items can be analyzed to determine trends and features of the geographic areas where the items are delivered.

The BI module 132 can compile and provide summary levels of information. Where privacy concerns dictate the identification of items received by an individual recipient, the distribution network can compile or aggregate information based for a defined geographic area. Additionally, where privacy concerns are implicated, the BI module 132 can compile or aggregate information based on the categories or types of items, rather than by identifying specific items sent to a specific recipient. The BI module 132 can be configured to provide data, trends, and any other information such that the recipients of specific items are not personally identifiable. For example, the BI module 132 may compile information about item delivery for a group of recipients. In the context of the postal service, the group of recipients may be grouped at a block level. The blocks may follow a geographically defined block, or may be defined as a group of recipients. Several blocks may be compiled together in a tract. In some embodiments, a tract could contain from between one hundred to several thousand individual recipients. The BI module 132 can compile data for blocks or tracts, or for any other desired geographic area. In some embodiments, the BI module 132 provides data which can be provided to subscribers, users, or other interested parties in support of a product or service offered by the real time tracking system 100, or the distribution network.

In some embodiments, the real-time tracking system 100 identifies a magazine or catalog as it moves through the distribution network. The BI module 132 can identify which magazines or catalogs are provided to a certain recipient or group of recipients based on the sender, mailer or shipper ID, and delivery destinations of the magazines and catalogs. Thus, based on the identity of a magazine or catalog and the destinations, the distribution network, via the data warehouse 110 and/or BI module 132 can extrapolate characteristics of recipients or groups of recipients based on the types of magazines and/or catalogs received. This data can be useful in many contexts. For example, the BI module 132 can identify that a particular block, neighborhood, or tract, subscribes to sporting magazines at a higher rate than other blocks or neighborhoods in the same city. A mailer, retailer, advertiser, or other entity affiliated with sports can then tailor advertisements, promotions, or other opportunities to the geographic area with a higher percentage of sports fans. A person of skill in the art will understand that the BI module 132 can extrapolate or identify demographic or other information in many different areas, in addition to those described herein.

In another example, the BI module 132 may identify a geographic area, such as a block, as receiving a higher number of packages from an online retailer than another block. This may indicate that the block that receives a higher number of packages is more involved in e-commerce and online shopping than another geographic area. An e-commerce agent or online retailer can then tailor its advertising distributions, offers, or promotions to the areas which indicate a preference for online shopping.

The BI module 132 may identify a block as receiving a higher number of infant or child related categories of items. The distribution network can then provide this information to retailers of toys and other child-related items.

As another example, when a new, highly anticipated electronics product, such as a video game console or platform, is released a video game maker may request the distribution network to provide information about which geographic areas are receiving a higher concentration of the new video game console or platform. Having this information, the video game maker can provide relevant offers or advertisements to those areas which have a concentration of video game consoles set for delivery.

The foregoing are only examples of the uses of information compiled from the distribution network. These are exemplary only, and are not intended to limit the scope of the disclosure. Additionally, although the examples refer to blocks as a geographical area, this does not limit the scope of geographic area used herein. Furthermore, the term block does not necessarily refer to a block as commonly understood in the context of a city. The term block can refer to any geographic area which incorporates more than one recipient of items.

The BI module 132 may use stored item identifications and associations from the data warehouse 110, such as historical delivery information and trends. The value of this information can provide operational efficiencies such as workforce allocation and others, and can support new products and services. In some embodiments, the distribution network may use a snap-shot or real-time information to compile the information.

The BI module 132 can, upon request, evaluate all the items currently in the distribution network which meet an identity and destination criteria. For example, a grocery store may have a time-sensitive or limited-time offer or promotion. The grocery store may request information from the distribution network for identity information of items that are currently in the distribution network. This way, the time-sensitive or limited-time offer may be directed to those who are currently scheduled to receive items related to or associated with the time-sensitive or limited-time offer. In some embodiments, the limited-time offer may be a physical item, such as mail, delivered to specific recipients. In some embodiments, the limited-time offer may be communicated to recipients via a digital communication, a phone call, or other communications collateral can be directed to those who are currently scheduled to receive the items associated with the time-sensitive or limited-time offer.

The BI module 132 may analyze item identifiers at various points or levels within the distribution network. The BI module 132 may identify items at the point of intake into the distribution network, and transmit the identity of the items or item categories to a central memory upon receipt. In some embodiments, the BI module 132 may determine the identity of items at a regional or centralized distribution hub. In some embodiments, the distribution network identifies the items at a unit distribution level, that is, at a distribution facility near the point of delivery. Thus, the BI module 132 can provide item identifications or types at multiple levels, or the BI module 132 can agglomerate identification or type information for defined geographic areas at a centralized processor and provide local, regional, national, or global information.

The BI module 132 may comprise a portal through which a third party interested in tract level information, or information at any level of granularity, can make requests for the distribution network to provide specific data regarding a block, tract, or other geographical area. Upon receiving a specific request, the BI module 132 can evaluate or analyze stored item identity and associated recipient information to identify trends, identify concentrations of certain types of items, and conduct comparisons between separate geographic areas, such as between tracts or groups of tracts to respond to the specific request. For example, a car dealership may wish to know which areas in a city or metropolitan area have higher car ownership rates or which are more likely to drive a specific make of car. The car dealership may access the BI module 132 via the portal 140 to look for or request this information. The distribution network can then evaluate the identities or origins of items delivered to recipients within the city or metropolitan area. The distribution network may identify items such as car payment notices, repair shop communications, advertisements for cars, parcels delivered from auto parts stores or automobile related retailers, and other automobile related items. The distribution network compiles this information and can provide a response to the specific request to the car dealership. In some embodiments, the distribution network can give a requester access to anonymized or de-identified block or tract level information in the neutral "sandbox" environment which would allow requesters to perform their own searching through distribution network data.

In some embodiments, the BI module 132 compiles information received from data sources other than item identity or sender identity. For example, the BI module 132 can receive information which identifies which residences or business are not receiving any deliveries due to being vacant, by resident request, or for a variety of other reasons. The distribution network can provide information regarding housing vacancies, business vacancies, to agencies interested in such information. By evaluating historical and current vacancy rates, the BI module 132 is able to provide vacancy trends. Similarly, by evaluating the historical number of addresses or destinations and comparing to the increase in delivery addresses or destinations in a particular geographic area (due to new construction, zoning, or other factors), the distribution network can identify trends in growing residential and/or commercial areas. Thus, in the case of the U.S. Postal Service, the distribution network can identify trends in population growth or loss, or other demographics for block, tract, state, region, zone, ZIP code, distribution area, district or national level, or any other desired area.

The housing and commercial vacancy or occupancy rates may be beneficial to government agencies, utilities, commercial retailers and others who can derive value in knowing population trends on block, tract, or other levels. For example, a utility may want to expand infrastructure to a block or tract. By knowing how occupancy or population of the tract is changing, the utility can make a more informed decision. As another example, a commercial retailer may want to expand or build another store or facility. The commercial retailer could request and/or obtain information from the BI module 132 regarding the fastest growing or shrinking tracts in a particular city, metropolitan area, state, etc., via a "sandbox" application or via some other interface. With this information, the commercial retailer can target its efforts on expansion and/or new construction of commercial sites in those which are growing most rapidly.

These exemplary functions of the BI module 132 may also be performed by any other portion of the real-time tracking system 100, such as a functional module 120 or an application module 130, without departing from the scope of the disclosure.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

The technology is operational with numerous other general purpose or special purpose computing system environments or configurations. Examples of well-known computing systems, environments, and/or configurations that may be suitable for use with the development include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. As used herein, the terms system, server, and module can refer to software applications, computers, network devices, databases, or other hardware or software capable of performing the described function. Servers, systems, and modules may be embodied on standalone computers, networked computers, or may be embodied on other portions of the real-time tracking system 100. Description of a component as a server, module, or a system does not limit the component thereto.

As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX® or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

Those of skill will further recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present development.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present development. At the very least, and not as an attempt to limit the application of the doctrine of equivalents to the scope of the claims, each numerical parameter should be construed in light of the number of significant digits and ordinary rounding approaches.

The above description discloses several methods and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

What is claimed is:

1. A system for real-time tracking of items comprising:
    a data repository in communication with a central processor, the central processor controlling input and output from the data repository;
    a plurality of item processing devices in communication with the data repository, at least one of the plurality of item processing devices located at a first facility and comprising:
        a scanner configured to scan a computer readable code on an item being processed in the item processing device to generate scan data; and
        a communication module configured to communicate with the central processor of the data repository and provide the scan data to the central processor for storage in the data repository in real-time;
    at least one module in communication with the central processor, the at least one module configured to request, receive, and manipulate the scan data from the data repository in real-time, and to generate information in real-time based on the manipulated scan data, wherein the at least one module comprises a predictive workload module configured to generate an expected inventory of items at a second facility, which is different than the first facility, based on scan data received from a scan of one or more items at the first facility; and
    an interface in communication with the at least one module, wherein the interface is configured to provide access to the generated information in real-time.

2. The system of claim 1, wherein the scan data comprises information indicative of the computer readable code and information indicative of the scanner.

3. The system of claim 2, wherein the information indicative of the scanner comprises scanner type, scanner location, and scan time.

4. The system of claim 1, wherein the at least one module further comprises an inventory module configured to generate a real-time, or near real-time inventory of items at the second facility based on the received scan data.

5. The system of claim 1, wherein the data repository is in communication with a plurality of distribution network systems, wherein the plurality of distribution network systems are configured to provide network information to the data repository.

6. The system of claim 5, wherein the plurality of distribution network systems include a transportation information system configured to provide transportation resource utilization information.

7. The system of claim 6, wherein the predictive workload module is further configured to generate the expected inventory of items at the second facility based on the transportation resource utilization information.

8. The system of claim 6, wherein the plurality of distribution network systems includes an item processing equipment system configured to provide item processing equipment information.

9. The system of claim 8, wherein the predictive workload module is further configured to generate the expected inventory of items at the second facility based on the item processing equipment information.

10. The system of claim 1, wherein the at least one module is a performance measurement module configured to analyze service performance based on the scan data.

11. The system of claim 1 further comprising an access portal configured to provide user access to the scan data or the generated information based on the manipulated scan data.

12. The system of claim 11, wherein the access portal is configured to allow selective access to scan data from items associated with a particular user.

* * * * *